J. C. Dow & I. Myrick.
Ruler.
N⁰ 35,812.   Patented Jul. 8, 1862.

Inventors.
Ira Myrick
by H. L. Stevens
by atty.

James C. Dow
By H. L. Stevens
his atty

Witnesses.
J. L. Hayes
A. Moore

UNITED STATES PATENT OFFICE.

JAMES C. DOW, OF HENDERSON, AND IRA MYRICK, OF LE SUEUR, MINNESOTA.

IMPROVEMENT IN PARALLEL-RULERS.

Specification forming part of Letters Patent No. 35,812, dated July 8, 1862.

*To all whom it may concern:*

Be it known that we, JAMES C. DOW, of Henderson, Sibley county, Minnesota, and IRA MYRICK, of Le Sueur, Le Sueur county, Minnesota, have invented a new and Improved Parallel-Ruler, of which the following is a correct description, reference being had to the accompanying drawings, and to the letters of reference marked thereon, herewith transmitted, in which drawings—

Figure 1:
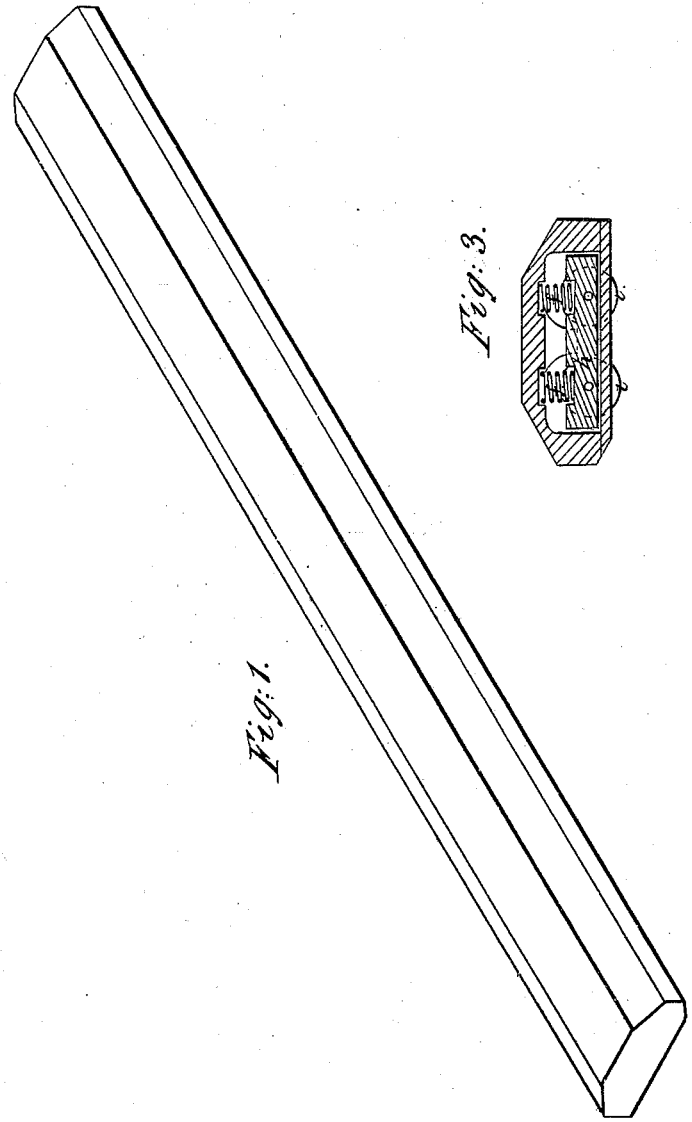
Figure 2:
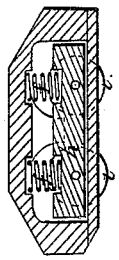
Figure 3:
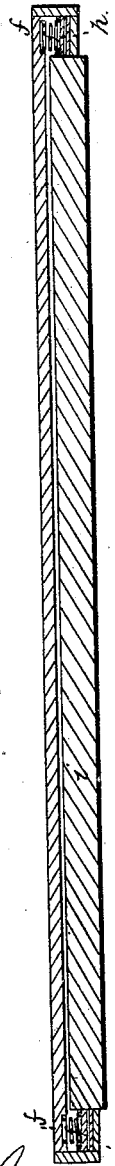

Figure 1 is an external perspective view. Fig. 2 is a longitudinal vertical section, and Fig. 3 is a transverse section through the spring $ff$ and bearing $h$.

The nature of our invention and the advantage derived from it consist in this, that the rollers move easily and lightly upon the paper, and when the ruler is at the point where the line is to be drawn a slight pressure upon it brings it down upon the surface of the paper and prevents it from sliding while the line is being drawn. The rollers may rest upon rubber insulated or upon spiral springs. The rollers $ii$ are supported by the insulated bearings $h$, said bearings supporting the springs $f$ $f$, as shown clearly in Fig. 3. The bearings, which are situated at the extremities of the ruler, may be made of rubber, in which case the spiral springs are suspended, the rubber bearings supporting the rollers in the same manner as when made of wood.

What we claim as our invention, and desire to secure by Letters Patent, is—

The application of springs made of metal, rubber, or any other suitable material to a parallel-ruler, in the manner and for the purposes above described.

JAMES C. DOW.
IRA MYRICK.

In presence of—
ED. L. BECKER,
N. MYRICK.